No. 717,043.                                                                          Patented Dec. 30, 1902.
J. G. SNYDER.
CYLINDER FOR THRESHING MACHINES.
(Application filed Dec. 10, 1901.)
(No Model.)                                                                              3 Sheets—Sheet 1.
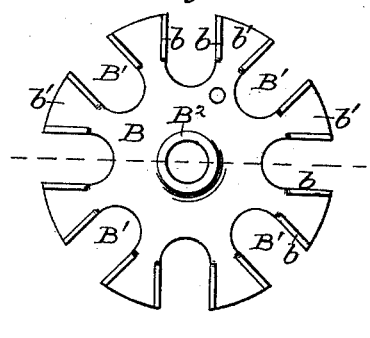
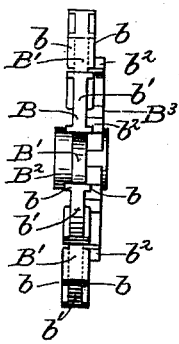
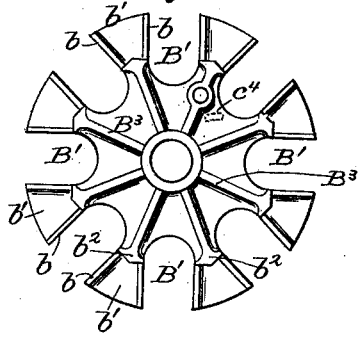
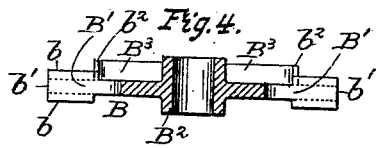
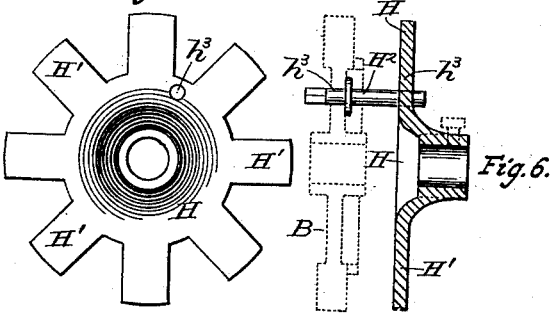
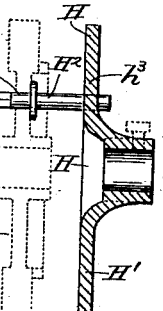
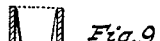
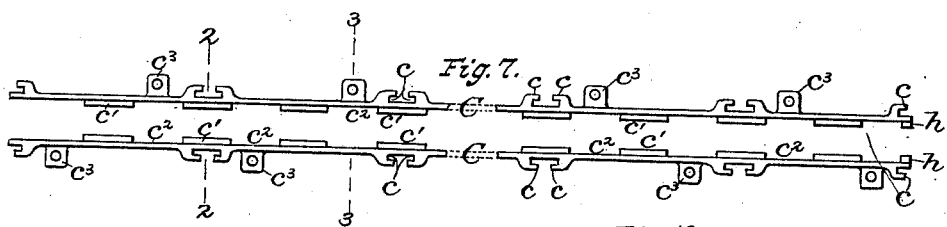
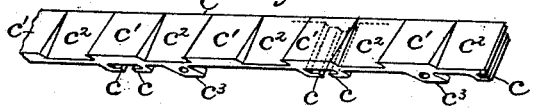
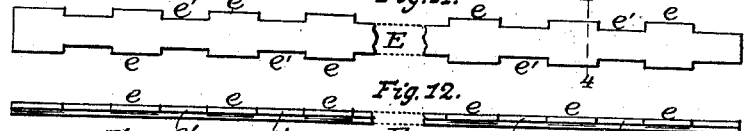
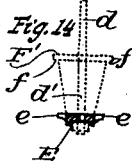
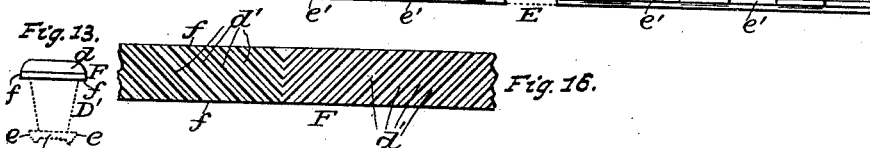
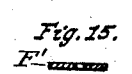
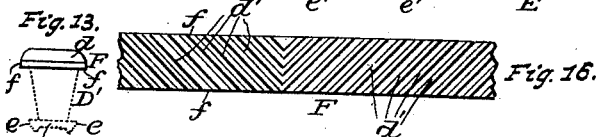
Witnesses,
Charles Dreving
Chas. R. Selkirk
John G. Snyder,
Inventor.
by Alex. Selkirk
attorney No. 717,043. Patented Dec. 30, 1902.
J. G. SNYDER.
CYLINDER FOR THRESHING MACHINES.
(Application filed Dec. 10, 1901.)
(No Model.) 3 Sheets—Sheet 2.

Witnesses,
Charles Seekins
Chas. P. Selkirk

John G. Snyder,
Inventor,
by Alex. Selkirk
attorney

No. 717,043. Patented Dec. 30, 1902.
J. G. SNYDER.
CYLINDER FOR THRESHING MACHINES.
(Application filed Dec. 10, 1901.)
(No Model.) 3 Sheets—Sheet 3.
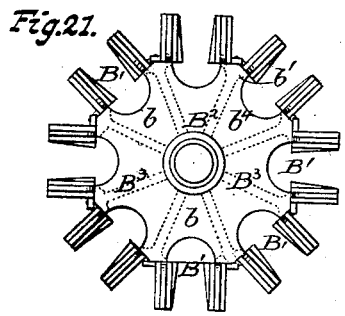
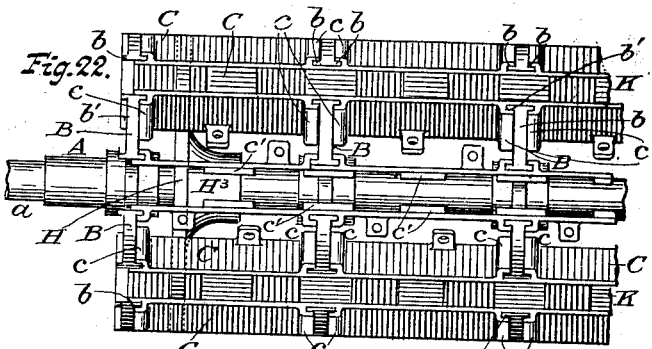
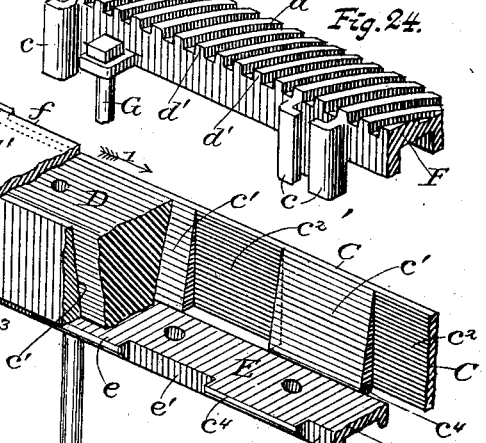
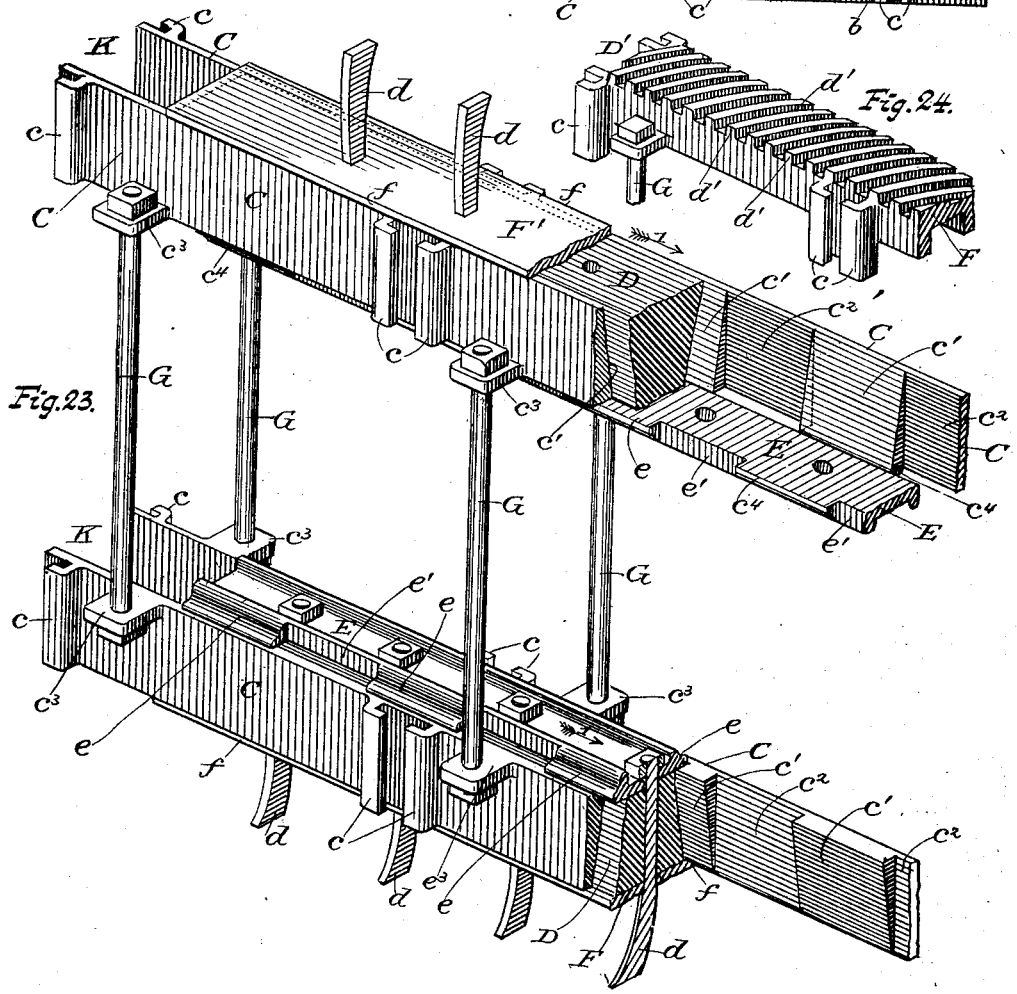
Witnesses.
Charles Selkirk
H. Selkirk Jr.
John G. Snyder,
Inventor.
by Alex. Selkirk
Attorney.

UNITED STATES PATENT OFFICE.

JOHN G. SNYDER, OF GREEN ISLAND, NEW YORK.

CYLINDER FOR THRESHING-MACHINES.

SPECIFICATION forming part of Letters Patent No. 717,043, dated December 30, 1902.

Application filed December 10, 1901. Serial No. 85,417. (No model.)

*To all whom it may concern:*

Be it known that I, JOHN G. SNYDER, a citizen of the United States, residing at Green Island, in the county of Albany and State of New York, have invented new and useful Improvements in Threshing-Cylinders for Threshing-Machines, of which the following is a specification.

My invention relates to threshing-cylinders of threshing-machines in which threshing-staves of one kind or class may be readily removed and replaced at pleasure by those of a different kind or class; and it consists of the novel features of construction and combinations and arrangements of parts and devices herein shown and described, and pointed out in the claims.

The objects of my invention are to produce a threshing-cylinder which may be readily changed at pleasure from a spike-tooth cylinder to a rubbing-cylinder and the reverse and to provide in a changeable threshing-cylinder means for securely holding the threshing-staves of the cylinder in place therein and from shifting.

Other objects and advantages of use of my invention will be fully understood from the following description and the claims when taken in connection with the annexed drawings, forming a part of this specification, in which the views in Sheet 1 show in detail the respective parts of my improved changeable cylinder before being assembled and combined, views in Sheet 2 show the parts combined for producing two classes of threshing-cylinders, and views in Sheet 3 illustrate essential elements in my changeable cylinder and my preferred manner of combining the same with some of the parts illustrated on enlarged scale.

Figure 17:
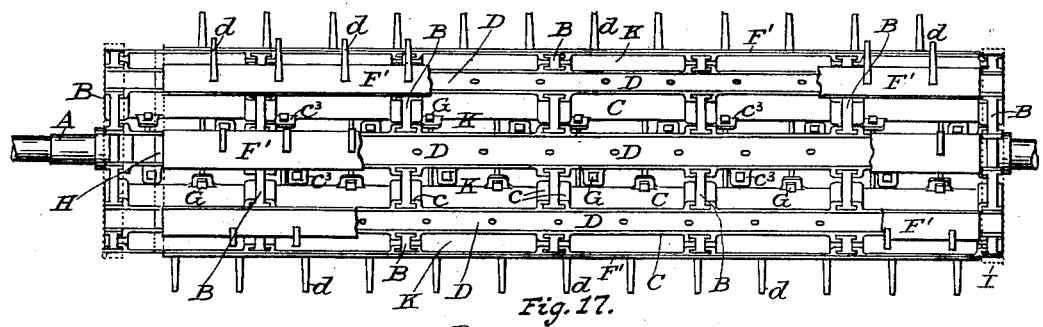
Figure 18:
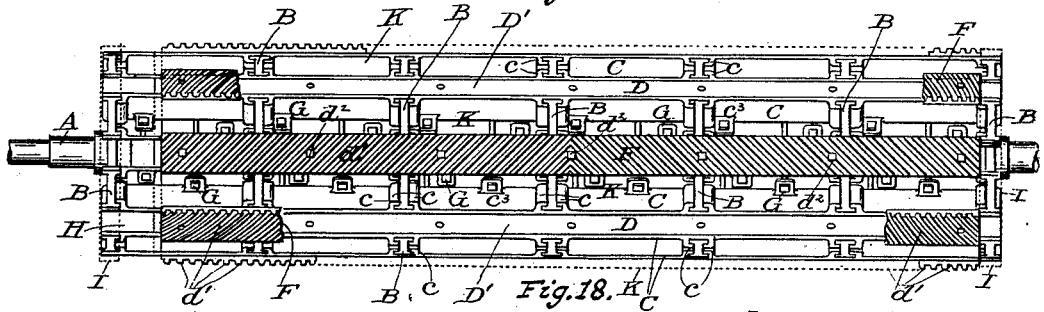
Figure 19:
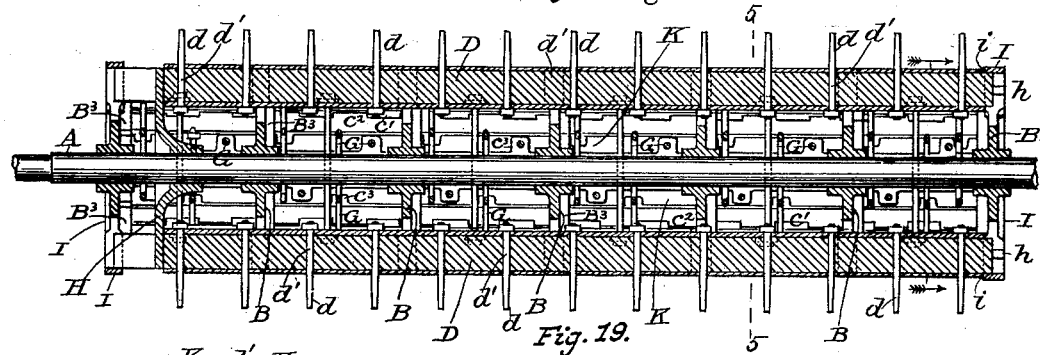
Figure 20:
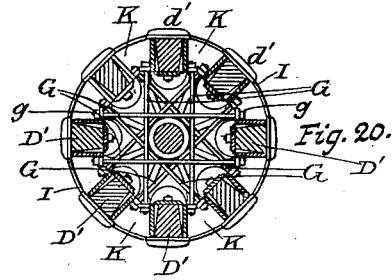

In Sheet 1, Figure 1 is a view of the stave-retaining disks from one of its sides. Fig. 2 is a view of the same from the opposite side. Fig. 3 is an edge view of the same. Fig. 4 is a section taken at line 1 in Fig. 1. Fig. 5 is a side view of the movable stave-locking disk viewed from its outer side. Fig. 6 is a sectional view of the same and of device preferred to be employed for moving said stave-locking disk and holding it in place. Fig. 7 is a plan of a parallel pair of stave-holding bars and their adjuncts designed to be connected with the stave-retaining disks shown in Figs. 1, 2, 3, and 4. Fig. 8 is a section of said stave-holding bars, taken at line 2 in Fig. 7. Fig. 9 is a section of the same, taken at line 3 in Fig. 7. Fig. 10 is a perspective view of said stave-retaining bars viewed from its inner side and lower edge. Fig. 11 is a plan of a lower side stave-plate of the changeable threshing-staves which may be employed. Fig. 12 is an edge view of the same. Fig. 13 is a plan of a rubbing-plate of a rubbing-stave. Fig. 14 is an end view of the same. Fig. 15 is a section at line 4 in Fig. 11, showing lower side plate of a spike-tooth threshing-stave adapted to receive a spike-tooth, the spike-tooth and the stave being indicated by dotted lines. Fig. 16 is a section of an upper side plate of a spike-tooth threshing-stave. In Sheet 2, Fig. 17 is a side view of a threshing-cylinder having spike-teeth staves and embodying my invention and produced by the combination of parts and devices shown in detail in the figures in Sheet 1. Fig. 18 is a side view of a threshing-cylinder having rubbing-staves and embodying my invention and produced by the combination of parts and devices shown in detail in the figures in Sheet 1, excepting Fig. 15, showing spike-tooth. Fig. 19 is a longitudinal section of my changeable cylinder and illustrating the same when made to be a spike-cylinder; and Fig. 20 is a section of my changeable cylinder, taken at line 6 in Fig. 18 and illustrating the same when a rubbing-cylinder. In Sheet 3, Fig. 21 is a view of the threshing-cylinder viewed from an outer end of the same and showing the outer ends of the stave-holding bars when secured in place and holding with outer end stave-retaining disk and before the disk-strengthening band is secured thereto and ready to receive the threshing-staves which may be selected to be employed in the changeable cylinder. Fig. 22 is a side view of a section of a threshing-cylinder having its essential parts combined and in place ready to receive the selected threshing-staves and the bolts for holding said staves from moving outwardly. Fig. 23 is a perspective view, on an enlarged scale, of the shaft of the cylinder shown by dotted lines, two oppositely-located pairs of stave-holding bars with threshing-staves secured therein, and retaining-bolts holding oppositely-located pairs of stave-holding bars in place and having the stave-retaining disks omitted; and Fig. 24 is a perspective view of a modification of a rubbing-stave made integral with holding-bars, as may be when preferred, and thereby dispensing with wood staves.

The same letters refer to similar parts throughout the several views.

In the drawings, Figs. 17, 18, 19, 20, 21, 22, and 24, A is the shaft of the threshing-cylinder, which shaft is provided with suitable journals $a$ $a$, Figs. 17 and 18, from which the shaft is supported from suitable bearings (not shown) in the machine it is to be used in and is revolved by any suitable driven pulley, as is the general practice. (Not shown.)

B B, Figs. 1, 2, 3, 4, 17, 18, 19, 20, 21, and 22, are stave-retaining disks employed in number as may be required by the length the cylinder is to be made and fixedly mounted on shaft A at suitable intervals. Extended radially from hub $B^2$ of these disks are spokes $B^3$, having mounted on their outer ends radial flanges $b'$, which are integral with said spokes and have integral with their lateral edge portions catching-tongues $b$ $b$, which are projected each way transverse to the direction of projection of said flanges $b'$, as shown in Figs. 3, 4, and 22.

B' B' are stave-receiving openings between each adjoining two-tongued flanges $b'$ $b'$.

C C are stave-holding bars employed in parallel pairs, as shown in Figs. 7, 8, 9, 17, 18, 20, 21, 22, and 23. These stave-holding bars are made with a suitable width of web in vertical direction and comprise a series of pairs of catching devices $c$ $c$, inclined and inwardly-projected cheeks $c'$, alternating with recesses $c^2$, and perforated lugs $c^3$, Figs. 7, 10, 22, and 23. The catching devices $c$ of each adjoining pair in each bar C together comprise a socket which receives the two catching-tongues $b$ $b$ integral with the radial flanges $b'$ of the stave-retaining disks B and hold with the said tongues, as shown in Fig. 22, while the inwardly-projected and inclined cheeks $c'$ $c'$ operate as inclined supports to the threshing-staves which are to be carried in this threshing-cylinder. The perforated lugs $c^3$ operate as holding devices for holding, coupling, or binding bolts in secure holding with said bars C, as will be hereinafter explained.

As this threshing-cylinder is designed to be changeable at will from one kind of threshing-cylinder to another by change of threshing-staves, so as to adapt it for use for threshing different kinds of grains, I provide at least two kinds of threshing-staves. Although three or more different kinds of staves may be provided, yet a description of two different kinds of threshing-staves will suffice for showing the changeable features of this cylinder and the adaptation of the parts thereof for effecting changes at pleasure of the said threshing-staves. These differing staves illustrated are spike-tooth staves D (indicated by dotted lines in Fig. 15 and shown by full lines in Figs. 17, 19, and 23) and rubbing-staves D', Figs. 18 and 20. These staves are shown to differ only in the kind or form of threshing device used. The spike-teeth staves D have spike-form teeth, as $d$, Figs. 15, 17, 19, and 23, made with usual form and suitably secured in their respective staves, as shown in said figures. The rubbing-staves D' have their rubbing-teeth $d'$ $d'$ made integral with suitable plates F and in the form of obliquely-arranged ledges projected outward from the horizontal web of said plate F to a short distance, as shown in Figs. 13, 14, 18, 20, and 24 and as generally practiced by the trade. The staves D and D' have each applied to its lower side plate E, Figs. 11, 12, and 15, which are also shown in Figs. 14, 19, 20, and 23. This plate E is the locking-plate of the staves, having integral with it the interlocking lips $e$ and alternating recesses or notches $e'$ and provided with perforations $e^2$ for receiving bolts of the spike-teeth or bolts for holding with the plates F of the rubbing-teeth. The interlocking lips $e$ of these plates E are adapted to register with recesses $c^2$ in the stave-holding bars C, and the notches $e'$ are adapted to register with the inwardly-projected and inclined cheeks $c'$ of said bars for purposes which will be hereinafter described. Plate F' (indicated in its cross direction by dotted lines in Fig. 15,) is shown by full lines in Figs. 17, 19, and 23 to be applied to the outer side of the spike-tooth stave D the same as plate F is applied to the rubbing-stave D', and the bolt portion $d^2$, Figs. 19 and 23, of each spike-tooth is shown to pass through the said outer side plate F', stave D, and under side plate E and secured by nut $d^3$, Figs. 19 and 23, thereby tightly clamping between said plates E and F' said staves D from their outer and under sides the same as do the bolts marked (also in Fig. 18) $d^2$, holding-plates E and F, clamping the rubbing-stave D'. The edge margins $f$ $f$ of the outer plates F and F', respectively, and edge margins of under plates E are shown by full and dotted lines in Figs. 14 and 15 to extend laterally out past the planes of the inclined sides of staves D', Fig. 14, and D, Fig. 15, which edge margins operate to bear, respectively, on the upper and lower edges of the stave-holding bars C C, the same as shown in Fig. 23, when the said bars C C will be rigidly secured in place in the cylinder.

The above-described parts are assembled and combined as follows: The stave-retaining disks B in a series of a suitable number are mounted and secured from moving on shaft A at distances apart corresponding to the distance the pairs of catching devices $c$ $c$ of the stave-holding bars C C are apart and are arranged on said shaft so that the catching-tongues $b$ $b$ of flanges $b'$ in each disk may be in line with those respectively corresponding with the others in the other disks and at the same time engage, respectively, with the catching devices $c$ $c$ of bars C C, as shown in Fig. 22. The said disks B being secured on shaft A, so as to revolve with it, and the bars C C being placed in holding with each of said disks by interlocking of tongues $b$ $b$ and catching devices $c$ $c$ are now secured from moving either lengthwise or outwardly in relation to shaft A by means of the coupling-bolts G G, Figs. 17, 18, 19, 20, and 23, having their ends passing through the perforated lugs $c^3$ $c^3$ of the bars C C of each two oppositely-located pairs and secured by suitable nuts $g$ $g$, as shown in Fig. 23.

When the parts above mentioned have been assembled and secured as above described, the threshing-staves, either D or D', having, respectively, the under side plates E described secured to them and also the respective outer plates F and F', may now be readily inserted in place between the stave-holding bars C C by bringing the staves opposite the openings between said bars, with the locking-lips $e$ $e$ of the under side plate E in register with the recesses $c^2$ $c^2$, provided with the inner sides of said bars C C, then dropping the staves down until the edge margins $f$ $f$ of each upper or outer plate F or F' are seated on the upper edges of the bars C C, as shown in Fig. 23, when the staves D or D' will be moved endwise in suitable direction, so as to carry the lips $e$ $e$ of the lower side plate E from opposite the recesses $c^2$ $c^2$ to opposite the lower side edges $c^4$ of the inclined portions $c'$ $c'$ of bars C, so the said edge portions $c^4$ may have bearing on the lips $e$ of plate E, as shown in Fig. 23, when the said threshing-staves will be securely held in place and from being moved in direction radially out from between the stave-holding bars C C. Stops $h$, Figs. 7 and 19, suitably connected with a suitable part of the threshing-cylinder, but preferably with the stave-receiving disk B at the end of the shaft A, as shown in Fig. 19, are provided to serve as devices to prevent the staves D and D' when in place from moving out past said end stave-receiving disk B.

H, Figs. 5, 6, 18, 19, and 22, is a movable locking-disk provided with suitable radial arms H' for bearing, respectively, against the outer ends of the threshing-staves D, as in Fig. 18, or D', as in Fig. 19, when in place between the stave-holding bars C C, as shown in said figures. This disk H is provided with a sleeve-form hub $H^2$ for a loose mounting on shaft A, whereby it may be freely moved in either direction on said shaft, as toward the ends of the threshing-staves, when they are to be locked in place from being moved longitudinally back toward the outer end disk B or when the said staves are to be moved endwise toward end disk B, so that the lips $e$ and notches $e'$ of plates E, secured to staves D, respectively, Fig. 19, may be registered with the cheeks $c'$ and recesses $c^2$ of bars C C, when said threshing-staves D, having spike-form teeth, may readily be removed from the cylinder and be replaced by staves D', provided with rubbing devices, as shown in Fig. 18, or the reverse, as the case may be. Suitable devices, as screw-bolt $H^2$, having plain neck $h$, working loosely in perforation $h'$ in end disk B, and having collar $h^2$ bearing against said disk and screwing in screw-threaded perforation $h^3$ in disk H and revolved in a suitable direction, may be employed for holding said disk H in place against the staves, or a set-nut $H^3$ (indicated by dotted lines in Fig. 6) may be employed for the same purpose.

I I, Figs. 17, 18, 19, and 20, are strong metal bands which are securely fastened to the circumference of each outer disk A, preferably by heating and shrinking process. These bands are of width about corresponding with the aggregated thickness of the flange portions $b'$ and outer tongue $b$ and are so set that their outer edges may be flush with the outer sides of the outer tongues $b$ and are calculated to serve as a strengthening element to said outer disks B and to give to said disks a continuous and smooth periphery, and thereby prevent straw from catching and winding on said disks.

The spike-teeth staves D, Fig. 17, and rubbing-staves D', Fig. 18, are duplicates each of the other in all respects, excepting as to the threshing elements they respectively are provided with, so that any one of each of these two kinds of staves may be readily interchangeable with the other for placement between the bars C C.

The openings K K between each pair of adjoining stave-receiving bars C C operate as fans for developing strong air-currents for action through the straw being threshed and while passing from between the threshing-cylinder and concave toward the separator. (Not shown.)

In some cases it may be advantageous to make the threshing-staves integral with the stave-holding bars C C, as illustrated in Fig. 24, in which case the rubbing devices $d'$ may be made integral with web $D^2$ in said figure and the latter $D^2$ be integral with holding-bars C C, as shown in Fig. 24, in which case the holding-bars C C will have omitted from them the cheeks $c'$ and recesses $c^2$, while the other elements—the catching devices $c$ $c$ and perforated lugs $c^3$ for engagement with coupling-bolts G G—will be employed as above described and for the same purposes.

By my above-described improvements a changeable threshing-cylinder may be cheaply produced and be provided with two or more differing sets of threshing-staves, as D and D', or other known kinds, as may be preferred, for use for threshing different kinds of grain or for preferred operations with straws of grain.

Having described my invention, what I claim, and desire to secure by Letters Patent, is—

1. In a cylinder of a threshing-machine, the combination with a central shaft adapted to be revolved, a series of stave-retaining disks B which are fixedly mounted on said shaft and are provided with a series of openings B' and a series of radial flanges $b'$ $b'$ alternating with said openings and having integral with them catching-tongues $b$ $b$, of a series of stave-holding bars C C, employed in pairs, in number corresponding with the number of said openings B', and having integral with them catching devices $c$ $c$ which are adapted to engage with said tongues $b$ $b$, and also having integral with them perforated lugs $c^3$ and coupling-bolts G G, holding bars C C, by the perforated lugs $c^3$ of each oppositely-located pair, securely connected to said stave-retaining disks, substantially the same as described.

2. In a changeable cylinder of a threshing-machine, the combination with a central shaft adapted to be revolved, a series of stave-retaining disks B which are fixedly mounted on said shaft and are provided, respectively, with a similar series of openings B' and a series of radial flanges $b'$ $b'$ alternating with said openings and having integral and at each opening catching-tongues $b$ $b$, of a series of removable bars C C employed in pairs in number corresponding with the number of openings B' in the respective disks B and having integral with them catching devices $c$ $c$ for engagement with said tongues $b$ $b$ and also having integral with them, devices adapted to hold with opposite ends of coupling-bolts, threshing-staves provided with threshing devices and suitably connected with each pair of said bars C, and coupling-bolts G G, holding each of said pairs of bars C respectively, and oppositely-located similar pairs of bars, respectively, securely held connected with said stave-retaining disks, substantially as set forth.

3. In a changeable cylinder of a threshing-machine, the combination with a revolving shaft, a series of stave-retaining disks B fixed on said shaft and provided, respectively, with a similar series of openings B' and a series of radial flanges $b'$ $b'$ alternating with said openings and having integral with them tongues $b$ $b$, of a series of removable bars C C employed in pairs in number corresponding with those of said openings B', in the respective disks, and having integral with them catching devices $c$ $c$ for engagement with said tongues $b$ $b$ and bolt-holding devices $c^3$ for reception of coupling-bolts, and also provided with inwardly-projected inclined cheeks $c'$ $c'$, alternating with recesses $c^2$, said cheeks and recesses being adapted to register respectively with recesses and interlocking lips which may be suitably connected with removable threshing-staves and adapted to be inserted between each pair of removable bars C, and coupling-bolts G G, holding each of said pairs of bars C, respectively and oppositely-located similar pairs of said bars securely connected with said stave-retaining disks, substantially as described.

4. In a changeable cylinder of a threshing-machine, the combination with a revolving shaft, a series of stave-retaining disks B fixed on said shaft and provided with a series of openings B' and flanges $b'$ $b'$ alternating with said openings and having integral with them tongues $b$, a series of pairs of removable bars C, corresponding in number with the said openings in the respective disks, and having integral with them catching devices $c$ $c$, which engage with said tongues $b$ $b$, and bolt-holding devices $c^3$ and also provided with inwardly-projected inclined cheeks $c'$ $c'$, alternating with recesses $c^2$, and coupling-bolts G G holding bars C coupled with the said stave-retaining disks, of removable staves having their outer sides provided with suitable threshing devices, and locking-plate E provided with interlocking lips $e$ and notches $e'$ alternating and registering with the cheeks $c'$ and recesses $c^2$, provided in said bars C C, and rigidly connected with the respective threshing-staves, and plates provided with threshing devices secured to the outer or peripheral side of said staves, the said staves having the latter plates and with plates E secured, respectively thereto, being adapted to be moved longitudinally with the said lips $e$ interlocking with the lower edges of the said cheeks $c'$, substantially as set forth.

5. In a changeable cylinder for a threshing-machine, the combination with a revolving shaft, a series of stave-retaining disks B, provided with stave-receiving openings B' and flanges $b'$ $b'$ alternating with the latter, and having integral with them tongues $b$, a series of pairs of removable bars C having integral with them catching devices $c$, which engage with said tongues, and bolt-holding devices $c^3$, and also provided with inwardly-inclined cheeks $c'$ $c'$ alternating with recesses $c^2$, and bolts G holding bars C coupled with said stave-retaining disks, of removable staves having their peripheral sides provided with plates with which are suitably connected threshing devices of kinds preferred, locking-plates E secured to said staves and provided with interlocking lips $e$, and alternating notches $e'$ which register with said cheeks $c'$ and recesses $c^2$ provided with said bars C, and movable stave-locking disk H mounted on said revolving shaft and adapted to be thrust against an end of each of said staves when lips $e$ interlock with the lower edges of cheeks $c'$ and mechanism adapted to hold said disk in place against the ends of said staves, substantially as set forth.

JOHN G. SNYDER.

Witnesses:
CHARLES SELKIRK,
A. SELKIRK, Jr.